US008962131B2

(12) United States Patent
Zou et al.

(10) Patent No.: US 8,962,131 B2
(45) Date of Patent: Feb. 24, 2015

(54) TRANSPARENT CONDUCTIVE FILM COMPRISING WATER SOLUBLE BINDERS

(75) Inventors: Choufeng Zou, Maplewood, MN (US); Karissa Eckert, Blaine, MN (US)

(73) Assignee: Carestream Health Inc., Rochester, NY (US)

( * ) Notice: Subject to any disclaimer, the term of this patent is extended or adjusted under 35 U.S.C. 154(b) by 0 days.

(21) Appl. No.: 13/382,232

(22) PCT Filed: Mar. 19, 2010

(86) PCT No.: PCT/US2010/000822
§ 371 (c)(1),
(2), (4) Date: Jan. 4, 2012

(87) PCT Pub. No.: WO2011/008227
PCT Pub. Date: Jan. 20, 2011

(65) Prior Publication Data
US 2012/0107598 A1  May 3, 2012

Related U.S. Application Data

(60) Provisional application No. 61/226,366, filed on Jul. 17, 2009.

(51) Int. Cl.
*B32B 27/04* (2006.01)
*B32B 27/12* (2006.01)
(Continued)

(52) U.S. Cl.
CPC .. *H01B 1/22* (2013.01); *C09D 5/24* (2013.01); *C09D 7/1291* (2013.01); *C08K 3/08* (2013.01);
(Continued)

(58) Field of Classification Search
CPC ........ B32B 15/00; B32B 15/04; B32B 15/08; B32B 15/09; B32B 2262/103; B32B 2311/08; C08K 3/08; H01B 1/22; C08L 89/06; C09D 189/06
USPC ........ 428/292.1, 297.4, 411.1, 457, 458, 480, 428/903, 475.2, 477.7, 300.7, 301.1, 301.4, 428/1.1–1.62; 427/108; 977/700, 762–772, 977/778, 784, 810, 864, 932, 952; 530/354–357; 106/160.1
See application file for complete search history.

(56) References Cited

U.S. PATENT DOCUMENTS

2006/0066803 A1  3/2006  Aylward et al.
2006/0215077 A1*  9/2006  Majumdar et al. .............. 349/88
(Continued)

FOREIGN PATENT DOCUMENTS

JP  2009-505358  2/2009
JP  2010-507199  3/2010
(Continued)

OTHER PUBLICATIONS

Care Chemicals, Larostat 264 A Technical Bulletin, BASF Chemicals, May 2013.*
(Continued)

*Primary Examiner* — Arti Singh-Pandey
*Assistant Examiner* — Frank Vineis
(74) *Attorney, Agent, or Firm* — Reed L. Christiansen

(57) ABSTRACT

Transparent conductive films comprising silver nanowires dispersed in polyvinyl alcohol or gelatin can be prepared by coating from aqueous solvent using common aqueous solvent coating techniques. These films have good transparency, conductivity, and stability. Coating on a flexible support allows the manufacture of flexible conductive materials.

11 Claims, 2 Drawing Sheets

(51) Int. Cl.
  *B05D 5/12* (2006.01)
  *B32B 15/08* (2006.01)
  *H01B 1/22* (2006.01)
  *C09D 5/24* (2006.01)
  *C09D 7/12* (2006.01)
  *C08K 3/08* (2006.01)

(52) U.S. Cl.
  CPC ........... *Y10S 428/903* (2013.01); *Y10S 977/762* (2013.01); *Y10S 977/778* (2013.01); *Y10S 977/784* (2013.01); *Y10S 977/81* (2013.01); *Y10S 977/952* (2013.01)
  USPC .................. 428/297.4; 428/300.7; 428/301.1; 428/301.4; 428/903; 427/108; 977/762; 977/778; 977/784; 977/810; 977/952; 530/354; 106/160.1

(56) References Cited

U.S. PATENT DOCUMENTS

| | | | |
|---|---|---|---|
| 2006/0217515 A1* | 9/2006 | Getman et al. | 528/38 |
| 2006/0257638 A1 | 11/2006 | Glatkowski et al. | |
| 2007/0074316 A1 | 3/2007 | Alden et al. | |
| 2008/0143906 A1* | 6/2008 | Allemand et al. | 349/43 |
| 2008/0286447 A1 | 11/2008 | Alden et al. | |
| 2008/0292979 A1 | 11/2008 | Ding et al. | |
| 2009/0130433 A1 | 5/2009 | Takada et al. | |
| 2009/0166055 A1 | 7/2009 | Guiheen et al. | |
| 2009/0242231 A1* | 10/2009 | Miyagisima et al. | 174/68.1 |
| 2009/0311530 A1* | 12/2009 | Hirai et al. | 428/401 |
| 2010/0247870 A1* | 9/2010 | Suzuki et al. | 428/172 |

FOREIGN PATENT DOCUMENTS

| | | |
|---|---|---|
| JP | 2010-267395 | 11/2010 |
| WO | WO02/076724 | 10/2002 |
| WO | WO2009/035059 | 3/2009 |
| WO | WO 2009054273 A1 * | 4/2009 |
| WO | WO2010/082428 | 7/2010 |

OTHER PUBLICATIONS

Gohsenol, Gohsifimer K, Nipon Gohsei, May 2013.*
Budnick, Reticulant Doped Semiconductive Epoxies and Plastics for High Voltage Applications, Nuclear Science Symposium and Medical Imaging Conference, 1991, Conference Record of the 1991 IEEE, pp. 1004-1008 vol. 2.*
PCT International Search Report, International application No. PCT/US2010/000822, Aug. 23, 2010, 2 pages.
C. Ducamp-Sanguesa e tal., Synthesis and Characterization of Fine and Monodisperse Silver Particles of Uniform Shape, Journal of Solida State Chemistry, vol. 100, pp. 272-280, 1992.
Yugang Sun et al., Polyol Synthesis of Uniform Silver Nanowires: A Plausible Growth Mechanism and the Supporting Evidence, Nano Letters, 2003, vol. 3, No. 7, pp. 955-960.
Yugang Sun et al., Uniform Silver Nanowires Synthesis by Reducing $AgNO_3$ with Ethylene Glycol in the Presence of Seeds and Poly (Vinyl Pyrrolidone), Chem. Mater, 2002, vol. 14, pp. 4736-4745.
Kylee E. Korte, Rapid synthesis of silver nanowires through a CuCl- or $CuCl_2$ -mediated polyol process, J. Mater. Chem., 2008, vol. 18, pp. 437-441.

* cited by examiner

US 8,962,131 B2

TRANSPARENT CONDUCTIVE FILM COMPRISING WATER SOLUBLE BINDERS

Priority is claimed from Provisional Application No. 61/226,366, entitled NANOWIRE-BASED TRANSPARENT CONDUCTIVE FILMS COMPRISING WATER SOLUBLE BINDERS, filed on Jul. 17, 2009 in the name of Chaofeng Zou, incorporated herein by reference.

FIELD OF THE INVENTION

This invention relates to electrically transparent conductive films comprising a random network of silver nanowires and water soluble polymers, and to methods of manufacturing and using these films.

BACKGROUND OF THE INVENTION

Transparent and conductive films (TCF) have been used extensively in recent years in applications such as touch panel displays, liquid crystal displays, electroluminescent lighting, organic light-emitting diode devices, and photovoltaic solar cells. Indium tin oxide (ITO) based transparent conductive film has been the transparent conductor-of-choice for most applications until recently due to its high conductivity, transparency, and relatively good stability. However, indium tin oxide based transparent conductive films have limitations due to the high cost of indium, the requirement of complicated and expensive vacuum deposition equipment and processes, and indium tin oxide's inherent brittleness and tendency to crack, especially when it is deposited on flexible substrates.

Two of the most important parameters for measuring the properties of transparent conductive films are total light transmittance (% T) and film surface electric conductivity. Higher light transmittance allows clear picture quality for display applications, higher efficiency for lighting and solar energy conversion applications. Lower resistivity is most desirable for most transparent conductive films applications so that power consumption can be minimized. Therefore, the higher the T/R ratio of the transparent conductive films is, the better the transparent conductive films are.

$$T/R\ Ratio = (\%\ total\ transmittance)/(film\ surface\ resistivity)$$

U.S. Patent Application Publication 2006/0257638A1 describes a transparent conductive film comprising carbon nanotubes (CNT) and vinyl chloride resin binder. The resulting transparent conductive film had T/R ratio raging from $3 \times 10^{-9}$ to 7.05.

U.S. Patent Application Publications 2007/0074316A1 and 2008/0286447A1 describe a transparent conductive film in which silver nanowires are deposited onto a substrate to form a bare nanowire network followed by overcoating the silver nanowire network with a polymer matrix material to form a transparent conductive film. Polymer materials such as polyacrylates and carboxyl alkyl cellulose polymers are suggested as useful materials for the matrix.

U.S. Patent Application Publication 2008/0292979 describes a transparent conductive film comprising silver nanowires, or a mixture of silver nanowires and carbon nanotubes. The transparent conductive network is formed either without binder or in a photoimageable composition. The transparent and conductive films were coated on both glass and polyethylene terephthalate (PET) supports.

U.S. Patent Application Publication 2009/0130433A1 describes a transparent conductive film which is formed from coating of silver nanowires to form a network followed by overcoating with a layer of urethane acrylate binder.

Problem to be Solved

It would be desirable to be able to prepare transparent conductive films in one step by coating a water soluble polymer dispersion of silver nanowires from an aqueous solvent. The polymer should be readily soluble in aqueous solution, capable of facilitating the dispersion of silver nanowires in aqueous solution, and could form strong and durable film in the presence of silver nanowires.

SUMMARY OF THE INVENTION

The invention provides a transparent conductive film comprising a random network of silver nanowires dispersed within a transparent water soluble polymer.

The invention also provides, a transparent conductive article comprising: a transparent support having coated thereon, a transparent conductive film comprising a random network of silver nanowires dispersed within a water soluble polymer.

The invention further provides a process for the formation of a transparent conductive article comprising: preparing a dispersion of silver nanowires in a solution of a water soluble polymer, coating, the dispersion onto a transparent support, and drying the coating on the support thereby forming a random network of silver nanowires.

The invention still further provides a process for the formation of a transparent conductive film comprising: preparing a dispersion of silver nanowires in a solution of a water soluble polymer, and coating and drying the dispersion thereby forming a random network of silver nanowires.

The invention also provides a transparent conductive article comprising: a transparent support having coated thereon, a carrier layer comprising at least one water soluble polymer and a cross linker, and a transparent conductive film comprising a random network of silver nanowires dispersed within a gelatin or water soluble polymer.

The invention still further provides a process for the formation of a transparent conductive article comprising: preparing a dispersion of silver nanowires in a solution of a gelatin or a polyvinyl alcohol polymer, preparing a carrier layer formulation comprising a single-phase mixture of two or more water soluble polymers, and coating the carrier layer formulation onto a transparent support, coating the dispersion of silver nanowires in a solution of a cellulose ester polymer, onto the carrier layer, and drying the coating on the support thereby forming a random network of silver nanowires.

Other aspects, advantages, and benefits of the present invention are apparent from the detailed description, examples, and claims provided in this application.

DETAILED DESCRIPTION OF THE INVENTION

Definitions

Figure 1:
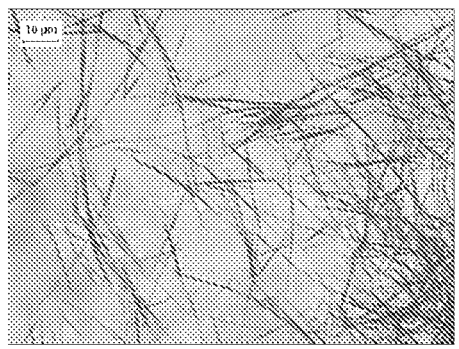
FIG. 1 is a photomicrograph of a transparent conductive film coated using water dispersed polyurethane Sancure 843 as the polymer binder as described in Example 5.

The terms "conductive layer" or "conductive film" refer to the network layer comprising silver nanowires dispersed within a water soluble polymer binder.

The term "conductive" refers to electrical conductivity.

The term "article" refers to the coating of a "conductive layer" or "conductive film" on a support.

The terms "coating weight", "coat weight", and "coverage" are synonymous, and are usually expressed in weight or moles per unit area such as $g/m^2$ or $mol/m^2$.

The term "transparent" means capable of transmitting visible light without appreciable scattering or absorption.

"Haze" is wide-angle scattering that diffuses light uniformly in all directions. It is the percentage of transmitted light that deviates from the incident beam by more than 2.5 degrees on the average. Haze reduces contrast and results in a milky or cloudy appearance. The lower the haze number, the less hazy the material.

The term "aqueous solvent" means water is present in the greatest proportion in a homogeneous solution as liquid component.

The term "water soluble" means the solute forms a homogenous solution with water, or a solvent mixture in which water is the major component.

The terms "a" or "an" refer to "at least one" of that component (for example, the anti-corrosion agents, nanowires, and polymers described herein). Thus the term "a random network of silver nanowires" can refer to one or more networks within a coating.

Furthermore, all publications, patents, and patent documents referred to in this document are incorporated by reference herein in their entirety, as though individually incorporated by reference.

The Silver Nanowires:

The silver nanowires are essential component to impart electrical conductivity to the conductive films, and to the articles prepared using the conductive films. The electrical conductivity of the transparent conductive film is mainly controlled by a) the conductivity of a single nanowire, b) the number of nanowires between the terminals, and c) the connectivity between the nanowires.

Below a certain nanowire concentration (also referred as the percolation threshold), the conductivity between the terminals is zero, as there is no continuous current path provided because the nanowires are spaced too far apart. Above this concentration, there is at least one current path available. As more current paths are provided, the overall resistance of the layer will decrease. However, as more current paths are provided, the percent of light transmission of the conductive film decreases due to light absorption and scattering by nanowires. Also, as the amount of silver nanowires in the conductive film increases, the haze of the transparent film increases due to light scattering by the silver nanowires. Similar effects will occur in transparent articles prepared using the conductive films.

In one embodiment, the silver nanowires have aspect ratio (length/width) of from about 20 to about 3300. In another embodiment, the silver nanowires have an aspect ratio (length/width) of from about 500 to 1000. Silver nanowires having a length of from about 5 µm to about 100 µm (micrometer) and a width of from about 30 nm to about 200 nm are useful. Silver nanowires having a width of from about 50 nm to about 120 nm and a length of from about 15 µm to about 100 µm are also useful for construction of a transparent conductive network film.

Silver nanowires can be prepared by known methods in the art. In particular, silver nanowires can be synthesized through solution-phase reduction of a silver salt (e.g., silver nitrate) in the presence of a polyol (e.g., ethylene glycol or propylene glycol) and poly(vinyl pyrrolidone). Large-scale production of silver nanowires of uniform size can be prepared according to the methods described in, e.g., Ducamp-Sanguesa, C. et al. *J. of Solid State Chemistry*, (1992), 100, 272-280; Sun, Y. et al., *Chem. Mater.* (2002), 14, 4736-4745; and Sun, Y. et al., *Nanoletters* (2003) 3(7), 955-960.

The Water Soluble Binders:

For a practical manufacturing process for transparent conductive films, it is desirable and important to have both the conductive component, such as silver nanowires, and a polymer binder in a coating solution. The water soluble polymer binder solution serves a dual role, as dispersant to facilitate the dispersion of silver nanowires and as a viscosifier to stabilize the silver nanowire coating dispersion so that the sedimentation of silver nanowires does not occur at any point during the coating process. This simplifies the coating process and allows for a one-pass coating, and avoids the currently used method of first coating bare silver nanowires to form a weak and fragile film that is subsequently over-coated with a polymer to form the transparent conductive film. Coating from aqueous solutions benefits the environment and reduces the emission of volatile organic compounds during manufacturing.

In order for a transparent conductive film to be useful in various device applications, it is also important for the binder of the transparent conductive film to be optically transparent and flexible, yet have high mechanical strength, hardness, and good thermal stability and light stability.

Additionally, in order to disperse and stabilize silver nanowires in polymeric coating solution, the use of polymer binders having a high oxygen content is advantageous. Oxygen-containing groups, such as hydroxyl group and carboxylate groups have a strong affinity for binding to the silver nanowire surface and facilitate the dispersion and stabilization in aqueous solvents.

The use of water soluble polymers, such as polyvinyl alcohol or gelatin as binders for silver nanowire based transparent conductors results in superior transparent conductive films in which both film transmittance and conductivity are greatly improved. Similar transparent conductive films prepared using aqueous dispersions of a polyurethane polymer binder show less desirable transmittance and conductivity. Transparent conductive films prepared using either polyvinyl alcohol or gelatin polymer binders also show excellent clarity, scratch resistance, and hardness when polymer cross linkers are added to the polymer solution. Transparent conductive films prepared according to this invention provide transmittance of at least 70% across entire spectrum range of about 350 nm to about 1100 nm, and surface resistivity of 500 ohm/sq or less.

The transparent conductive articles comprising silver nanowires and water soluble polymer binders also show excellent clarity, high scratch resistance and hardness. In addition, transparent conductive films prepared using these polymer binders have good adhesion on a polyethylene terephthalate (PET) support when the polyester supported is pre-coated with a gelatin sub-layer.

The water soluble polymer binders are present in from about 40 to about 95 wt % of the dried transparent conductive films. Preferably, they are present in from about 60 to about 85 wt % of the dried films.

In some constructions, up to 50 wt % of the gelatin or polyvinyl alcohol polymer binder can be replaced by one or more additional polymers. These polymers should be compatible with the gelatin or polyvinyl alcohol polymer binder. By compatible is meant that the polymers form a transparent, single phase mixture when dried. The additional polymer or polymers can provide further benefits such as promoting adhesion to the support and improving hardness and scratch resistance. Water soluble acrylic polymers are particularly preferred as additional polymers. Examples of such polymers are polyacrylic acid polyacrylamides, and copolymers thereof. As above, total wt % of all polymers is from about 50 to about 95 wt % of the dried transparent conductive films. Preferably, the total weight of all polymers is from about 70 to about 85 wt % of the dried films.

Coating of the Conductive Films:

An aqueous coating formulation for the transparent conductive layers can be prepared by mixing the various components with one or more polymer binders in water or by mixing with a small amount of a water miscible solvent such as methanol, ethanol, propanol, or acetone. Transparent films containing silver nanowires can be prepared by coating aqueous solvent formulations using various coating procedures such as wire wound rod coating, dip coating, air knife coating, curtain coating, slide coating, slot-die coating, roll coating, gravure coating, or extrusion coating. Surfactants and other coating aids can be incorporated into the coating formulation.

A useful dry coating thickness of the transparent conductive coating is from about 0.05 to about 2.0 μm, and preferably from about 0.2 to about 1.0 μm.

Upon coating and drying, the transparent conductive film should have a surface resistivity of less than 1,000 ohms/sq and preferably 500 ohm/sq or less.

Upon coating, and drying, the transparent conductive film should have as high a % transmittance as possible. A transmittance of at least 70% is useful. A transmittance of at least 80% and even at least 90% are even more useful.

Films with a transmittance of at least 80% and a surface resistivity of 500 ohm/sq or less are more useful.

Also useful are conductive films wherein the silver nanowires are present in an amount sufficient to provide a transmittance of at least 70%, a surface resistivity of 500 ohm/sq or less, have an aspect ratio of from about 20 to about 3300, and are present in an amount of from about 30 mg/m$^2$ to about 120 mg/m$^2$.

Particularly preferred are conductive films having a transmittance of at least 85% across entire spectrum range of from about 350 nm to about 1100 nm, and surface resistivity of 500 ohm/sq or less.

The transparent conductive films comprising silver nanowires and water soluble polymer binders also show excellent clarity, high scratch resistance and hardness.

If desired, scratch resistance and hardness of the transparent conductive films can be improved by use of a crosslinking agent to crosslink the gelatin or polyvinyl alcohol polymer binder. Aldehydes or polycarboxylic acids such as succinic acid, maleic acid, or boric acid are typical crosslinking agents for polyvinyl alcohol binders. Vinyl sulfones are typical crosslinking agents for gelatin binders. Typical examples of vinyl sulfones are, bis(vinylsulfonyl)-methane (BVSM), bis(vinylsulfonylmethyl)ether (BVSME) and bis(vinylsulfonylethyl)ether (BSEE).

The Transparent Support:

In one embodiment, the conductive materials are coated onto a support. The support may be rigid or flexible.

Suitable rigid substrates include, for example, glass, acrylics, polycarbonates and the like.

When the conductive materials are coated onto a flexible support, the support is preferably a flexible, transparent polymeric film that has any desired thickness and is composed of one or more polymeric materials. The support is required to exhibit dimensional stability during coating and drying of the conductive layer and to have suitable adhesive properties with overlying layers. Useful polymeric materials for making such supports include polyesters [such as poly(ethylene terephthalate) (PET) and poly(ethylene naphthalate) (PEN)], cellulose acetate and other cellulose esters, polyvinyl acetal, polyolefins, polycarbonates, and polystyrenes. Preferred supports are composed of polymers having good heat stability, such as polyesters and polycarbonates. Support materials may be treated or annealed to reduce shrinkage and promote dimensional stability. They may also be treated to enhance adhesion of water based polymer coating layers. Transparent multi-layer supports can also be used.

Coating of the Conductive Films onto a Support:

Transparent conductive articles can be prepared by coating the aqueous solvent-based formulations described above onto a transparent support using various coating procedures such as wire wound rod coating, dip coating, air knife coating, curtain coating, slide coating, slot-die coating, roll coating, gravure coating, or extrusion coating.

Alternatively, transparent conductive articles can be prepared by laminating the transparent conductive films prepared as described above onto a transparent support.

In some embodiments, a "carrier" layer formulation comprising a single-phase mixture of two or more water soluble polymers may be applied directly onto the support and thereby located between the support and the silver nanowire layer. The carrier layer serves to promote adhesion of the support to the transparent polymer layer containing the silver nanowires. The carrier layer formulation can be sequentially or simultaneously applied with application of the transparent conductive silver nanowire layer formulation. It is preferred that all coating be applied simultaneously onto the support. Carrier layers are often referred to as "adhesion promoting layers", "interlayers", or "intermediate layers". As used herein, these terms are synonymous.

As noted above, in one embodiment the coating weight of the silver nanowires is from about 20 mg/m$^2$ to about 500 mg/m$^2$. In other embodiments, coating weight of silver nanowires is from about 20 mg/m$^2$ to about 200 mg/m$^2$. Embodiments wherein the silver nanowires are coated at from about 30 mg/m$^2$ to about 120 mg/m$^2$ are also contemplated.

Upon coating and drying, the transparent conductive article should have a surface resistivity of less than 1,000 ohms/sq and preferably 500 ohm/sq or less.

Similarly, upon coating and drying on a transparent support, the transparent conductive article should have as high an optical transmittance as possible. A transmittance of at least 70% is useful. A transmittance of at least 80% and even at least 90% are even more useful.

Particularly preferred are articles with a transmittance of at least 85% and a surface resistivity of 500 ohm/sq or less.

The following examples are provided to illustrate the practice of the present invention and the invention is not meant to be limited thereby.

MATERIALS AND METHODS FOR THE EXPERIMENTS AND EXAMPLES

All materials used in the following examples are readily available from standard commercial sources, such as Aldrich Chemical Co. (Milwaukee, Wis.) unless otherwise specified. All percentages are by weight unless otherwise indicated. The following additional methods and materials were used.

All coating weights refer to the dried films unless otherwise specified.

BVSM stands for Bis(vinylsulfonyl)methane and was obtained from Eastman Kodak (Rochester, N.Y.) and has the structure shown below.

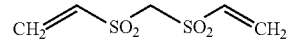

LAROSTAT® 264A quaternary ammonium compound is an ethyl sulfate based cationic quaternary salt available from BASF (Florham Park, N.J.).

P-382 (VS-1) is described in U.S. Pat. No. 6,143,487 and has the structure shown below.

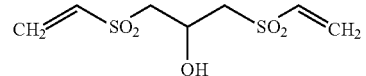

Gel 30 is a standard gelatin and was obtained from Eastman Gelatin (Rochester, N.Y.).

Gel-PB is a phthalated gelatin and was obtained from Eastman Gelatin (Rochester, N.Y.).

Marble gel was obtained from Eastman Gelatin (Rochester, N.Y.).

PET is polyethylene terephthalate and is a support for the silver nanowire/polymer coatings. The terms support and substrate are used herein interchangeably.

PVA-1 is a polyvinyl alcohol (99% hydrolyzed) having a molecular weight of 89,000 to 98,000. It was obtained from Aldrich Chemical Company (Milwaukee, Wis.).

PVA-2 is ELVANOL® 52-22polyvinyl alcohol resin, a medium viscosity, partially hydrolyzed polyvinyl alcohol available from Dupont Company (Wilmington, Del.).

PVA-2 is CELVOL® 523 a polyvinyl alcohol resin, available from Celanese Chemicals (Dallas, Tex.).

Mayer bars are ½ inch diameter Type 303 stainless steel coating rods and are available from R.D. Specialties, Inc. (Webster, N.Y.).

SANCURE® 843 aliphatic waterborne polyurethane dispersion and SANCURE® 898 aliphatic waterborne polyurethane dispersion are available from Lubrizol Advanced Materials, Inc. (Cleveland, Ohio).

Silver nanowires were obtained from Seashell Technologies, LLC, (LaJolla, Calif.). They were used in preparing samples for Examples 1-6.

Silver nanowires were prepared according to the procedure of Korte, K. E; Skrabalak, S. E.; Xia, Y; *J. Materials Chem.*, 18, 437-441 (2008). They were used in preparing samples for Examples 7-12.

Zonyl® FS-300 is a general-purpose, nonionic fluorosurfactant available from Dupont Chemical Solutions Enterprise (Wilmington, Del.).

Measurement of Resistivity

Surface resistivity was measured using an R-CHEK model RC2175 Surface Resistivity meter available from Electronic Design To Market, Inc. (Toledo, Ohio).

Measurement of Percent Transmission

Transmission (%) was measured in accord with ASTM D 1003 by conventional means using a Haze-gard Plus Hazemeter that is available from BYK-Gardner (Columbia, Md.). To provide consistent transmission measurements, all samples within each Example were coated onto the same lot of support.

Measurement of Adhesion

Samples were evaluated using a "cross-hatch" adhesion test performed according to ASTM D3359-92A. A coated film was cut with a razor blade in a cross-hatched pattern, a 1 inch (2.54 cm) wide piece of commercially available 3M Type 610 semi-transparent pressure-sensitive tape was placed on the pattern and then quickly lifted off. The amount of coating left on the film is the measure of adhesion. The adhesion test ratings are from 0 to 5 where 0 refers to complete removal of the coating and 5 refers none of the coating removed. A rating of "3" or greater is considered to be acceptable. 3M Type 610 semi-transparent pressure-sensitive tape was obtained from 3M Company (Maplewood, Minn.).

Preparation of Transparent Conductive Coatings

Preparation of Transparent Conductive Films

Examples 1, 4, 5, and 6

To a solution of 0.5 g of the polymer premix solution, as shown below in TABLE II, was added 0.4 g of deionized water, 0.10 g of a silver nanowire dispersion in 2-propanol (5.09% silver nanowires) and 0.01 g of Zonyl FS-300.

The dispersion was mixed on a roller mixer for 10 minutes to obtain a uniform dispersion. The dispersion was coated onto a 7-mil (178 µm) clear polyethylene terephthalate support using a #10 Mayer rod. The resulting coating was dried in oven at 220° F. (104° C.) for 10 min to obtain a transparent film suitable for testing.

Samples were tested for surface resistivity, % transmission, and adhesion to the support as described above.

Preparation of Transparent Conductive Films

Examples 2 and 3

To a solution of 0.5 g of the polymer premix solution, as shown below in TABLE II, was added 0.3 g of deionized water, 0.10 g of a silver nanowire dispersion in 2-propanol (5.09% silver nanowires).

The dispersion was mixed on a wrist shaker for 5 minutes to obtain a uniform dispersion. The dispersion was coated onto a 7-mil (178 µm) clear, gel-subbed polyethylene terephthalate support using a #11 Mayer rod. The resulting coating was dried in oven at 210° F. (98.9° C.) for 5 min to obtain a transparent film suitable for testing.

Samples were tested for surface resistivity, % transmission, and adhesion to the support as described above.

The results, shown below in TABLE I, demonstrate that transparent conductive films, coated from polyvinyl alcohol or gelatin have a much lower resistivity than transparent conductive films similarly prepared, but using a water dispersed polyurethane binder.

Photographs of samples of films prepared in Examples 2 and 5 were taken.

FIG. 1 is a photomicrograph photograph of a transparent conductive film coated using a water dispersed polyurethane as the binder as described in Example 5. The photomicrograph shows aggregation of silver nanowires in the polymer matrix, resulting in coatings with poorer conductivity.

Figure 2:
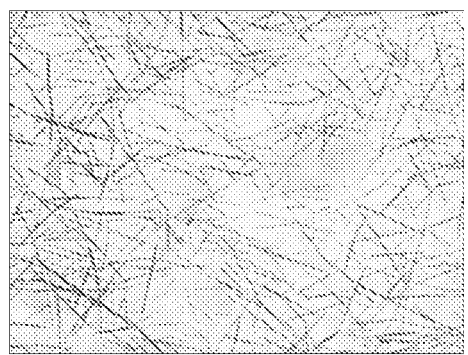
FIG. 2 is a photomicrograph of a transparent conductive film using polyvinyl alcohol as the binder, as described in Example 2.

FIG. 2 is a photomicrograph of a transparent conductive film coated using polyvinyl alcohol as the binder as described in Example 2. The photomicrograph shows a uniform network of interconnected silver nanowires dispersed within the polyvinyl alcohol binder. This sample has good conductivity, transparency, and adhesion to the PET support. The silver nanowires are well dispersed in the polyvinyl alcohol polymer binder resulting in formation of a good percolation network and good conductivity.

TABLE I

| Example | Polymer | Silver Nanowire dimensions | Resistivity (Ohm/square) | Percent Transmittance | T/R ratio | Adhesion |
| --- | --- | --- | --- | --- | --- | --- |
| PET Support | — | — | Non-conductive | 88 | — | — |
| 1-Inventive | PVA-1 | 85 nm/14.7 µm | 70 | 83 | 1.19 | 0 |
| 2-Inventive | PVA-2 | 85 nm/14.7 µm | 310 | 84 | 0.19 | 5 |
| 3-Inventive | PVA-3 | 85 nm/14.7 µm | 250 | 83 | 0.33 | 5 |
| 4-Inventive | Gel-1 | 85 nm/14.7 µm | 40 | 84 | 2.10 | 0 |
| 5-Non Inventive | PU-1 | 85 nm/14.7 µm | 700 | 83 | 0.12 | 0 |
| 6-Non Inventive | PU-2 | 85 nm/14.7 µm | 800 | 84 | 0.11 | 0 |

TABLE II

| Polymer Premix | Polymer (g) | | Deionized Water | Biocide |
|---|---|---|---|---|
| PVA-1 | Aldrich PVA (99% hydrolyzed, 90K) | (8 g) | 192 g | — |
| PVA-2 | ELVANOL Resin | (8 g) | 192 g | — |
| PVA-3 | CELVOL 523 Resin | (8 g) | 192 g | — |
| Gel-1 | Gel-PB | (8 g) | 192 g | 4-Cl-3,5-dimethyl phenol (0.04 g) |
| PU-1 | SANCURE 843 Dispersion | (25 g) | 175 g | — |
| PU-2 | SANCURE 898 Dispersion | (25 g) | 175 g | — |

Preparation of Transparent Conductive Films

Examples 7, 8, and 9

To a solution of 0.4 g of gelatin premix solution melted at 50° C., prepared as shown in TABLE III, was added 0.7 g of deionized water, 0.016 g of 1% Larostat 264A in deionized water, 0.05 g of 1% BVSM in water (gelatin crosslinker), and 0.1 g of a silver nanowire dispersion in 2-propanol (5.5% silver nanowires).

The resulting solution was mixed on a wrist shaker for 5 minutes to obtain a uniform dispersion. The dispersion was coated onto a 4-mil (102 μm) clear, gel-subbed polyethylene terephthalate support using a #10 Mayer rod. The resulting coating was dried at 205° F. (96.1° C.) for 5 minutes to obtain a transparent film suitable for testing.

Samples were tested for surface resistivity, % transmission, and adhesion to the support as described above.

Preparation of Transparent Conductive Film

Example 10

This film was prepared as for Examples 7, 8, and 9 except the 1% BVSM solution added to the silver nanowire solution was replaced with 0.096 g of 1% P-382 solution in deionized water.

Preparation of Transparent Conductive Film

Example 11

To a solution of 0.5 g of polymer premix, as shown in TABLE III, was added 0.3 g of deionized water, and 0.1 g of a silver nanowire dispersion in 2-propanol (5.5% silver nanowires).

The dispersion was mixed on a wrist shaker for 5 minutes to obtain a uniform dispersion. The dispersion was coated onto a 7-mil (178 μm) clear, gel-subbed polyethylene terephthalate support using a #11 Mayer rod. The resulting coating was dried at 205° F. (96.1° C.) for 5 minutes to obtain a transparent film suitable for testing.

Samples were tested for surface resistivity, % transmission, and adhesion to the support as described above.

Preparation of Transparent Conductive Films

Example 12

This conductive film was prepared as a two-layer structure. The first coating layer was prepared as follows. 5 g of 4% polymer premix, prepared as shown in TABLE III, was added to 3.0 g of deionized water, and 0.15 g of 30% glyoxal in water. The solution was coated onto a 4-mil (102 μm) clear, gel-subbed polyethylene terephthalate support using a #10 Mayer rod. The resulting coating was dried at 205° F. (96.1° C.) for 5 minutes.

The following procedure was used to prepare the silver nanowire coating layer. To a solution of 0.3 g of polymer premix, as shown in TABLE III, was added 0.65 g deionized water, and 0.1 g of a silver nanowire dispersion in 2-propanol (5.5% silver nanowires).

The dispersion was mixed on a wrist shaker for 5 minutes to obtain a uniform dispersion. The dispersion was coated onto a 4-mil (102 μm) clear, gel-subbed polyethylene terephthalate support over the glyoxal/polymer coating using a #11 Mayer rod. The resulting coating was dried at 205° F. (96.1° C.) for 5 minutes to obtain a transparent film suitable for testing.

Samples were tested for surface resistivity, % transmission, and adhesion to the support as described above. The results from Non-Inventive Examples 5 and 6 are included for comparison.

The results shown in TABLE IV, demonstrate, that transparent conductive films, coated from gelatin or polyvinyl alcohol have a much lower resistivity than transparent conductive films similarly prepared, but using a water/polyurethane dispersion binder.

Photographs of samples of films prepared in Examples 7 and 12 were taken.

Figure 3:
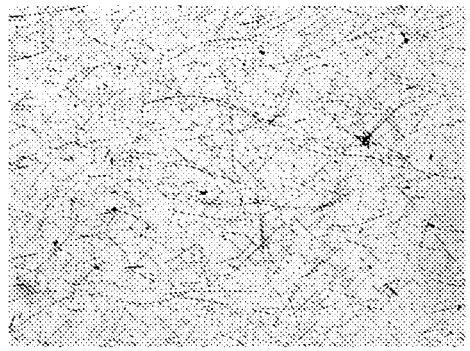
FIG. 3 is a photomicrograph of a transparent conductive film using gelatin as the binder, as described in Example 7.

FIG. 3 is a photomicrograph of a transparent conductive film using gelatin as the binder, as described in Example 7. The photomicrograph shows a uniform network of interconnected silver nanowires dispersed within the gelatin binder. The sample has good conductivity, transparency, and adhesion to the subbed PET support. The silver nanowires are well dispersed in the gelatin binder resulting in formation of a random network and good conductivity.

Figure 4:
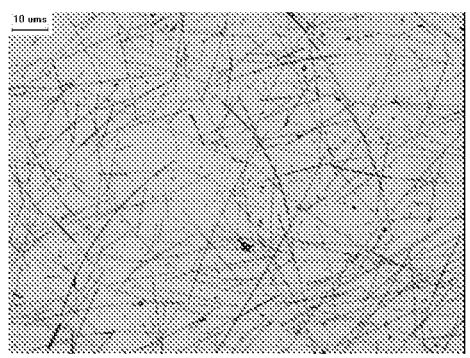
FIG. 4 is a photomicrograph of a transparent conductive film using polyvinyl alcohol as the binder in a two layer structure, as described in Example 12.

FIG. 4 is a photomicrograph of a transparent conductive film using polyvinyl alcohol as the binder in a two layer structure, as described in Example 12. The photomicrograph shows a uniform network of interconnected silver nanowires dispersed within the polyvinyl alcohol binder. The sample has good conductivity, transparency, and adhesion to the subbed PET support. The silver nanowires are well dispersed in the polyvinyl alcohol binder resulting in formation of a random network and good conductivity.

TABLE III

Preparation of Polymer Premix

| Polymer Premix | Polymer (g) | | Deionized Water | Biocide |
|---|---|---|---|---|
| Gel-1 | Gel-PB | (8 g) | 192 g | 4-Cl-3,5-dimethylphenol (0.04 g) |
| Gel-2 | Marble Gel | (8 g) | 192 g | 4-Cl-3,5-dimethyl phenol (0.04 g) |
| Gel-3 | Gel 30 | (8 g) | 192 g | 4-Cl-3,5-dimethyl phenol (0.04 g) |
| PVA-1 | GOHSEFIMER K-21 Resin | (45 g) | 255 g | — |
| PVA-2 | ELVANOL Resin | (8 g) | 192 g | — |
| PVA-3 | CELVOL Resin 523 | (8 g) | 192 g | — |
| PU-1 | SANCURE 843 Dispersion | (25 g) | 175 g | — |
| PU-2 | SANCURE 898 Dispersion | (25 g) | 175 g | — |

TABLE IV

| Example | Polymer | Silver Nanowire Dimension | Resistivity (Ohm/sq) | Percent Transmittance | T/R Ratio | Adhesion |
|---|---|---|---|---|---|---|
| PET-Support | — | — | Non-conductive | — | — | — |
| 7-Inventive | Gel-1 | 85 nm/14.7 μm | 86 | 88 | 1.02 | 5 |
| 8-Inventive | Gel-2 | 85 nm/14.7 μm | 119 | 88 | 0.74 | 5 |
| 9-Inventive | Gel-3 | 85 nm/14.7 μm | 86 | 88 | 1.03 | 5 |
| 10-Inventive | Gel-1 | 85 nm/14.7 μm | 185 | 89 | 0.48 | 5 |
| 11-Inventive | PVA-1 | 85 nm/14.7 μm | 241 | 86 | 0.36 | 5 |
| 12-Inventive | PVA-1 | 85 nm/14.7 μm | 64 | 86 | 1.36 | 5 |
| 5-Non-Inventive | PU-1 | 85 nm/14.7 μm | 700 | 83 | 0.12 | 0 |
| 6-Non-Inventive | PU-2 | 85 nm/14.7 μm | 800 | 84 | 0.11 | 0 |

The invention claimed is:

1. A transparent conductive article comprising:
a transparent support having coated thereon;
a transparent conductive film comprising a random network of silver nanowires dispersed within a water soluble polymer comprising gelatin and at least one ethyl sulfate based quaternary ammonium compound,
wherein the transparent conductive article exhibits a transmittance of at least 70% across entire spectrum range of from about 350 nm to about 1100 nm and a surface resistivity of 500 ohm/sq or less.

2. The transparent conductive article of claim 1 wherein the transparent support is a flexible transparent polymer film.

3. The transparent conductive article of claim 1, wherein the transparent support is a polyethylene terephthalate.

4. The transparent conductive article of claim 1 wherein the silver nanowires have an aspect ratio of from about 20 to about 3300.

5. The transparent conductive article of claim 1 wherein the silver nanowires are present in an amount of from about 20 mg/m² to about 500 mg/m².

6. The transparent conductive article of claim 1 further comprising up to 50 wt % of one or more additional water soluble polymers.

7. The transparent conductive article of claim 6 wherein one or more of the additional water soluble polymers is a polyacrylic polymer.

8. The transparent conductive article of claim 1 further comprising a vinyl sulfone crosslinking agent.

9. The transparent conductive article of claim 1 further comprising a transparent polymer layer located between the transparent support and the transparent conductive film.

10. The transparent conductive article according to claim 8, wherein the vinyl sulfone crosslinking agent comprises bis(vinylsulfonyl)methane, bis(vinylsulfonylmethyl)ether, or bis(vinylsulfonylethyl)ether.

11. The transparent conductive article according to claim 8, wherein the vinyl sulfone crosslinking agent comprises bis(vinylsulfonyl)methane or the compound represented by the following structure:

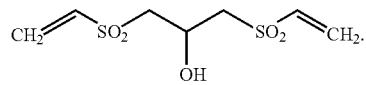

* * * * *